(12) United States Patent
Lucas

(10) Patent No.: US 11,941,748 B2
(45) Date of Patent: Mar. 26, 2024

(54) LIGHTWEIGHT VIEW DEPENDENT RENDERING SYSTEM FOR MOBILE DEVICES

(71) Applicant: INTEL CORPORATION, Santa Clara, CA (US)

(72) Inventor: Blake Lucas, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/849,404

(22) Filed: Jun. 24, 2022

(65) Prior Publication Data

US 2022/0319103 A1 Oct. 6, 2022

Related U.S. Application Data

(63) Continuation of application No. 17/122,253, filed on Dec. 15, 2020, now Pat. No. 11,410,377, which is a
(Continued)

(51) Int. Cl.
*G06T 15/20* (2011.01)
*G06N 20/00* (2019.01)
(Continued)

(52) U.S. Cl.
CPC ............ *G06T 15/20* (2013.01); *G06N 20/00* (2019.01); *G06T 7/194* (2017.01); *G06T 7/246* (2017.01);
(Continued)

(58) Field of Classification Search
CPC ..... G06T 15/20; G06T 15/205; G06T 15/503; G06T 7/194; G06T 7/246; G06T 7/254;
(Continued)

(56) References Cited

U.S. PATENT DOCUMENTS 6,973,130 B1 12/2005 Wee et al.
2009/0066696 A1 3/2009 Williams
(Continued)

FOREIGN PATENT DOCUMENTS

JP 2015187797 10/2015

OTHER PUBLICATIONS

Goldlücke, Bastian, and Marcus Magnor. "Real-time free-viewpoint video rendering from volumetric geometry." Visual Communications and Image Processing 2003. vol. 5150. SPIE, 2003. (Year: 2003).*

(Continued)

*Primary Examiner* — Daniel F Hajnik
(74) *Attorney, Agent, or Firm* — Hanley, Flight & Zimmerman, LLC

(57) ABSTRACT

An example system for lightweight view dependent rendering is described herein. An example mobile device includes a display, instructions, and processor circuitry to execute instructions to extract a moving region within a first set of frames of volumetric video content captured by a plurality of real-world cameras facing a scene at different angles. The processor circuitry to generate a first billboard based on a cropped area of the frames in the first set of frames, the cropped area corresponding to the first moving region. The processor circuitry to, in response to user selection of a first view of the scene, cause presentation of the first billboard on the display. The processor circuitry to, in response to a change from the first view to a second view of the scene, cause a second billboard to replace the first billboard on the display.

20 Claims, 9 Drawing Sheets

Related U.S. Application Data continuation of application No. 16/192,296, filed on Nov. 15, 2018, now abandoned.

(51) Int. Cl.

| | |
|---|---|
| *G06T 7/194* | (2017.01) |
| *G06T 7/246* | (2017.01) |
| *G06T 7/254* | (2017.01) |
| *G06T 7/292* | (2017.01) |
| *G06T 15/50* | (2011.01) |

(52) U.S. Cl.
CPC .............. *G06T 7/254* (2017.01); *G06T 7/292* (2017.01); *G06T 15/205* (2013.01); *G06T 15/503* (2013.01); *G06T 2207/10028* (2013.01); *G06T 2207/20132* (2013.01); *G06T 2207/30196* (2013.01); *G06T 2207/30228* (2013.01)

(58) Field of Classification Search
CPC ........... G06T 7/292; G06T 2207/10028; G06T 2207/20132; G06T 2207/30196; G06T 2207/30228; G06N 3/08; G06N 20/00
See application file for complete search history.

(56) References Cited

U.S. PATENT DOCUMENTS

| | | | |
|---|---|---|---|
| 2009/0315978 A1 | 12/2009 | Wurmlin et al. | |
| 2012/0120113 A1 | 5/2012 | Hueso | |
| 2013/0016097 A1 | 1/2013 | Coene et al. | |
| 2013/0063549 A1 | 3/2013 | Schnyder et al. | |
| 2014/0169663 A1 | 6/2014 | Han et al. | |
| 2018/0199039 A1* | 7/2018 | Trepte .................. | G06T 19/006 |
| 2019/0088005 A1 | 3/2019 | Lucas | |
| 2021/0097755 A1 | 4/2021 | Lucas | |

OTHER PUBLICATIONS

Scheer, Jonas, Carlos Fernández de Tejada Quemada, and Oliver Grau. "A client-server architecture for real-time view-dependent streaming of free-viewpoint video." 2017 3DTV Conference: The True Vision-Capture, Transmission and Display of 3D Video (3DTV-CON). IEEE. Date of Conference Jun. 7-9, 2020 (Year: 2017).*

Video titled, "Soccer on Your Tabletop", uploaded by Konstantinos Rematas, viewable at: https://www.youtube.com/watch?v=eRGAB4QBS6U; Published Jun. 3, 2018; select screenshots included. (Year: 2018).*

Rematas, Konstantinos, et al. "Soccer on Your Tabletop." arXiv preprint arXiv:1806.00890 (Jun. 3, 2018). (Year: 2018).*

United States Patent and Trademark Office, "Non-Final Office Action," issued in connection with U.S. Appl. No. 16/192,296, dated Apr. 28, 2020, 27 pages.

United States Patent and Trademark Office, "Non-Final Office Action," issued in connection with U.S. Appl. No. 16/192,296, dated Aug. 21, 2019, 20 pages.

United States Patent and Trademark Office, "Final Office Action," issued in connection with U.S. Appl. No. 16/192,296, dated Sep. 16, 2020, 33 pages.

Waschbusch et al., "3D Video Bill Board Clouds," Computer Graphics Forum. vol. 26. No. 3 Oxford, UK Blackwell Publishing Ltd. 2007, 9 pages.

Ohta et al., "Live 3D Video in Soccer Stadium," International Journal of Computer Vision 75.1 Feb. 2007, 173-187, 15 pages.

Germann et al., "Articulated Billboards for Video-Based Rendering," Computer Graphics Forum vol. 29, No. 2 Oxford, UK: Blackwell Publishing Ltd. 2010, 10 pages.

Koyama et al., "Real-Time Transmission of 3D Video to Multiple Users via Network," Conference on Machine Vision Application, May 16-18, 2005, 4 pages.

United States Patent and Trademark Office, "Final Office Action," issued in connection with U.S. Appl. No. 16/192,296, dated Jan. 2, 2020, 26 pages.

Sanches et al., "The Generation of Scenes in Mixed Reality Environments using the Chromakey Technique." 17th Int'l Conf. on Artificial Reality and Telexistence (ICAT 2007), IEEE, 2007, 2 pages.

United States Patent and Trademark Office, "Non-Final Office Action," issued in connection with U.S. Appl. No. 17/122,253, dated Jun. 21, 2021, 20 pages.

United States Patent and Trademark Office, "Final Office Action," issued in connection with U.S. Appl. No. 17/122,253, dated Oct. 22, 2021, 23 pages.

United States Patent and Trademark Office, "Advisory Action," issued in connection with U.S. Appl. No. 17/122,253, dated Jan. 7, 2022, 3 pages.

United States Patent and Trademark Office, "Notice of Allowance and Fee(s) Due" issued in connection with U.S. Appl. No. 17/122,253, dated Mar. 23, 2022, 8 pages.

Kameda et al., "Free viewpoint browsing of live soccer games," 2004 IEEE International Conference on Multimedia and Expo (ICME)(IEEE Cat. No. 04TH8763). vol. 1, IEEE, 2004. (Year 2004), 4 pages.

Fang et al., "Free-viewpoint Video Synthesis of Soccer Match using Multiple Camera Sources." 2014. (Year 2014), 6 pages.

* cited by examiner

100

200

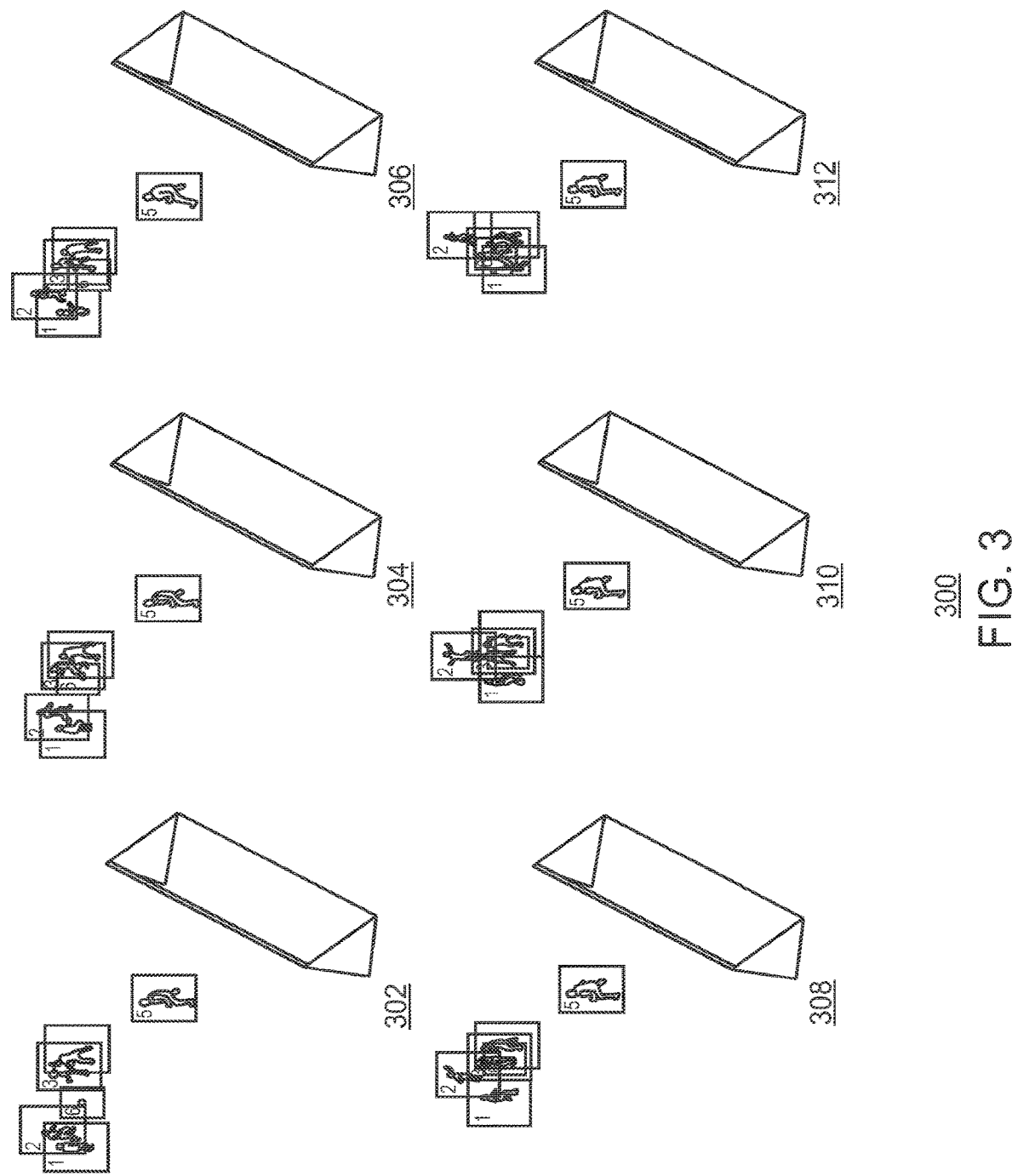

400

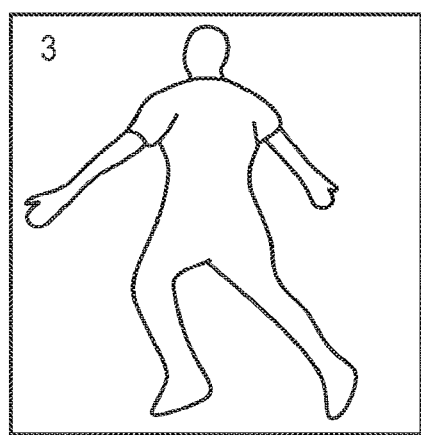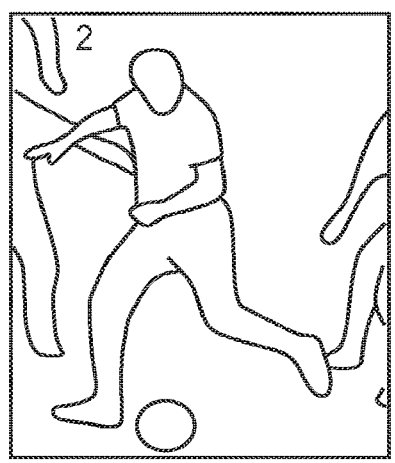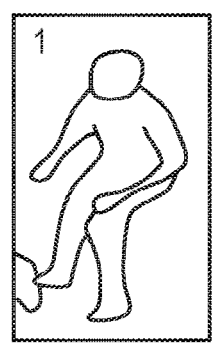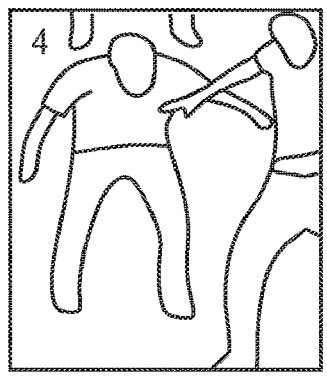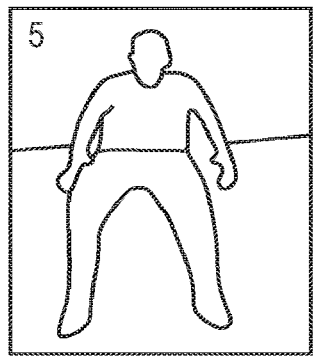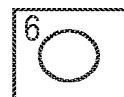
FIG. 5

LIGHTWEIGHT VIEW DEPENDENT RENDERING SYSTEM FOR MOBILE DEVICES

RELATED APPLICATION(S)

This patent arises from a continuation of U.S. patent application Ser. No. 17/122,253, which was filed on Dec. 15, 2020, and is a continuation of U.S. patent application Ser. No. 16/192,296, which was filed on Nov. 15, 2018. U.S. patent application Ser. No. 17/122,253 and U.S. patent application Ser. No. 16/192,296 are hereby incorporated herein by reference in their entireties. Priority to U.S. patent application Ser. No. 17/122,253 and U.S. patent application Ser. No. 16/192,296 is claimed.

BACKGROUND

Volumetric video is a data-heavy representation of a captured scene. In some cases, the data may consist of three-dimensional point clouds for each time instance plus video data from each camera view. The full data set for a volumetric video can be gigabytes to terabytes for only minutes of capture time. This amount of data is manageable for VFX pipelines, but can be intractable for real-time or mobile applications.

BRIEF DESCRIPTION OF THE DRAWINGS

FIG. 3 is an illustration of decomposing a plurality of frames into moving regions;

FIG. 5 is a plurality of billboards extracted from the second camera perspective;

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
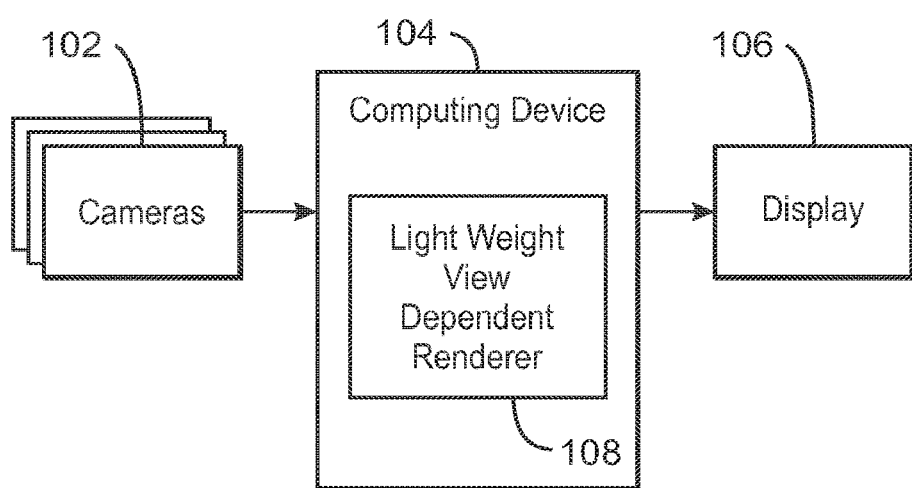
FIG. 1 is a block diagram illustrating an example system for lightweight view dependent rendering on mobile devices.

As discussed above, volumetric video can overwhelm devices that lack the cluster compute resources of visual effects (VFX) pipelines. Volumetric video typically includes a large amount of data to be processed for a short period of time, often only minutes. The data can be in the form of three-dimensional (3D) point clouds, which are combined with video data such as textures to create a 3D rendering of the scene. The point clouds for each time instance plus video data from each camera view contribute to the large amount of data processed when rendering volumetric video. Traditional volumetric rendering systems focus on true six degree-of-freedom camera motions for a virtualized scene. To render camera parallax with minimal artifacts, traditional rendering may use a disparity map, stereo matching between overlapping billboards, real-time visual hulls, or articulated billboards that approximate human forms.

The present disclosure relates generally to techniques for a lightweight view dependent rendering system for mobile devices. In embodiments, the present techniques can restrict camera motion to avoid the need to render images with parallax, which contributes little added value. The present techniques also render each camera view without embedding or inferring depth information. The present techniques use the position of billboards to render views of the scene. A matte can be applied to a background region, including the portions of the billboards that include the background region. The matted background region can be replaced during rendering with a background that includes computer generated components.

To comply with mobile device restrictions on data, compute, and rendering performance, the present lightweight rendering system makes specific simplifications to a rendering pipeline so that volumetric video applications can provide a good user experience on mobile devices. In particular, the present techniques decompose volumetric video into a handful of moving regions, track each region in world space and produce cropped videos of each moving region for each camera perspective. Foreground objects are segmented to produce a matte for each camera view that is used later for rendering a background replacement. In embodiments, the matte is an object that will render in a single color until it is replaced by a background. Moving billboards that represent each cropped region are created for each camera, where each billboard is encoded by its time varying position and image-to-world scaling factor. To render this data on a mobile device, the user swipes left/right/up/down to flip through neighboring camera perspectives. In response to this user input, only billboards associated with that camera view are rendered. There is no depth-based interpolation between billboards associated with different views, but there may be an artistic fade between camera views. An artistic fade, as used herein, is a billboard-based interpolation that excludes depth values. Moreover, pinch/zoom controls on the device perform two-dimensional (2D) rescaling of billboards in the image space, and the user can long touch hold and drag to translate the scene in 2D image space on a touchscreen device.

Because the present techniques employ 2D rescaling and translation of the virtual scene for rendering, there is no compensation for the misalignment of overlapping billboards caused by parallax. Moreover, because the volumetric capture dome is configured to capture content from perspectives that are canonical positions for rendering, the 3D perspectives may be mimicked or faked by flipping through different camera views. The use of billboards eliminates the need to compress or stream point clouds. Thus, the present techniques can use 2D video compression for each camera view. Since camera perspectives are independent and the user can only flip through neighboring perspectives, the camera views can be dynamically loaded and unloaded on demand. For increased performance and responsiveness, video streams for different cameras may be cached and pre-buffered so that transitioning between camera views is faster.

In embodiments, the billboard representation is packaged in metadata of a video file, according to a video coding standard. For example, the video file may be encoded according to a Moving Picture Experts Group (MPEG)

standard. In particular, the billboard data representation can be embedded in an auxiliary channel of an MPEG video, using two-dimensional drawing techniques for rendering. An MPEG file may include compressed video, compressed audio, and data used to synchronize the audio, video, and any other related data stream. The billboard can be encoded according to metadata encoding standards within a video coding standard.

A typical MPEG video includes audio, video, and auxiliary data packaged into fixed-length packets. The billboard data representation (i.e., coordinates and dimensions of each moving bounding box, estimate of distance from moving billboard to camera, and image-to-world scaling factor) can be packaged into the related data stream of an MPEG file. In embodiments, the MPEG file may include an auxiliary channel. The one or more billboards as described below can be packaged onto the auxiliary channel of the MPEG file. Additionally, in embodiments, the billboard representation is packaged into an ancillary data field of an MPEG bitstream. In this manner, power usage is minimized on the mobile device. As described below, the cropped videos could be encoded either as a single MPEG video or split into separate videos. The separate videos include one video per billboard for each particular camera perspective. The use of separate videos enables parallelism and scalability in decoding and streaming processes.

FIG. 1 is a block diagram illustrating an example system for lightweight view dependent rendering on mobile devices. The example system is referred to generally by the reference number 100 and can be implemented in the mobile device 600 below in FIG. 6 using the method 700 of FIG. 7 below.

The example system 100 includes a plurality of cameras 102, a computing device 104, and a display 106. The computing device 104 includes a lightweight view dependent renderer 108. As shown in FIG. 1, a plurality of cameras 102 may capture images or video to be rendered via the computing device 104 by a display 106. For example, the cameras 102 may be arranged for volumetric capture. In particular, the cameras may be arranged in a capture dome where each camera faces inwards to a scene or content as described below with respect to FIGS. 2A and 2B. By capturing the scene in this format, a user can traverse along the outside of the scene. A user can change the point of view by moving around the perimeter and spinning or rotating the scene.

The cameras 102 can capture a scene to enable as many degrees of freedom as feasible to explore the captured scene in a three-dimensional data representation. In particular, six degrees of freedom may be enabled such that the scene can be traversed using via yaw, pitch, and roll applied to a view point. The scene may also be traversed by translating the view point up and down and side-to-side. A user may also zoom in and out, or the zoom functionality can be applied automatically, without user input. Volumetric capture often enables a user to move around the capture scene in a seamless fashion.

The computing device 104 may receive images from the cameras 102. For ease of description, the cameras 102 are illustrated as transmitting images directly to the computing device 104. However, the images may be processed prior to transmission to the computing device 104. The cameras 102 capture an entire scene via images that are used to generate a series of point clouds and videos for each camera perspective. The position of each camera, camera orientations, and the intrinsic parameters of the camera are known. With traditional volumetric video, a user can view the scene via the point clouds and videos that are rendered according to the position, orientation, and parameters of each camera.

The lightweight view dependent renderer 108 can extract dynamic, moving regions from the existing volumetric video content. Each moving region can be tracked in the existing volumetric video content and consolidated into one cropped video per each camera. Static objects are not tracked and are not included in the cropped video. Alternatively, each moving region extracted from existing volumetric content and used to create a cropped video that includes only one moving region. In this manner, a number of smaller videos, each containing a single moving region, can be created for each camera view. Moving regions may often overlap. When moving regions overlap, the uncertainty of which cropped video will include the overlapping content may be determined manually.

The lightweight view dependent renderer 108 can segment foreground regions from the background regions in the existing volumetric video content to produce a matte. The foreground regions include the dynamic content, such as the moving regions, at each time instance. The matte includes the background region. Matting the background enables a silhouette of the dynamic content to be extracted from each image. In some cases, the matte may be a traveling matte, where the matte changes as the moving region changes over time. Accordingly, a traveling matte will change in shape and size corresponding to the change in the moving regions at each time instance.

The lightweight view dependent renderer 108 may also generate moving billboards from each cropped video. A cropped video includes a sequence of images that are rendered in chronological order. For each image, a billboard is generated. A billboard is a flat, two-dimensional, camera facing object. The billboard may be defined by a bounding box. In embodiments, the billboard may be referred to as a two-dimensional element extracted from a three-dimensional data representation and mapped onto a flat plane. Accordingly, a billboard includes minimal depth information (i.e., a single distance measurement from camera to billboard content) and is limited to a static texture. The billboard changes position in each image as the tracked dynamic object (moving region) moves. In embodiments, the billboard represents a rectangular crop around a moving object in the foreground region. To enable the appropriate silhouette shape within the rectangular shape of the billboard, the matted-out background region within each billboard may be replaced with a computer-generated background, a video feed, or other image.

The display 106 may be configured to render one or more billboards from the lightweight view dependent renderer 108. In some cases, the images may be rendered in response to input from a user. Additionally, the images can be rendered automatically, without user input, where a user simply views the changing images. The particular billboard rendered is based on a timestamp associated with the image containing the billboard and the corresponding camera view. The corresponding camera view may be determined from a user input. For example, a mobile device may include a touchscreen and the display 106. In response to swipe input from a user, the display 106 may render the appropriate camera views at the next time step from the lightweight view dependent renderer 108. The mobile device may include an inertial sensor that is to determine the position of the mobile device in space. In response to movement from a user and tracked by the inertial sensor, the display 106 may render the appropriate camera views from the lightweight view dependent renderer 108 on top of the mobile device's internal camera feed or a synthetic background. In another example, the display 106 may be a component of a head mounted display (HMD). The HMD can send information to the computing device 104 regarding the position and translation of the HMD. The HMD may be configured to receive the camera views from the lightweight view dependent renderer 108 and render the views in the HMD. Additionally, the images can be rendered automatically at a display.

Regardless of the technique used to traverse a captured scene, each rendered camera view is dependent on the prior view. For each camera perspective, a sequence of captured images is used to produce a collection of small, cropped videos. These cropped videos are extracted from the sequence of captured images for each camera perspective. By rendering the cropped videos across neighboring camera perspectives, an illusion is created that a viewer is spinning or revolving the content. Thus, in embodiments, changing camera views provides an illusion that the content is occurring in the observed scene in an orientation and position that is perceptually plausible.

The diagram of FIG. 1 is not intended to indicate that the example system 100 is to include all of the components shown in FIG. 1. Rather, the example system 100 can be implemented using fewer or additional components not illustrated in FIG. 1 (e.g., additional cameras, computing devices, components, head mounted displays, etc.).

Figure 2A:
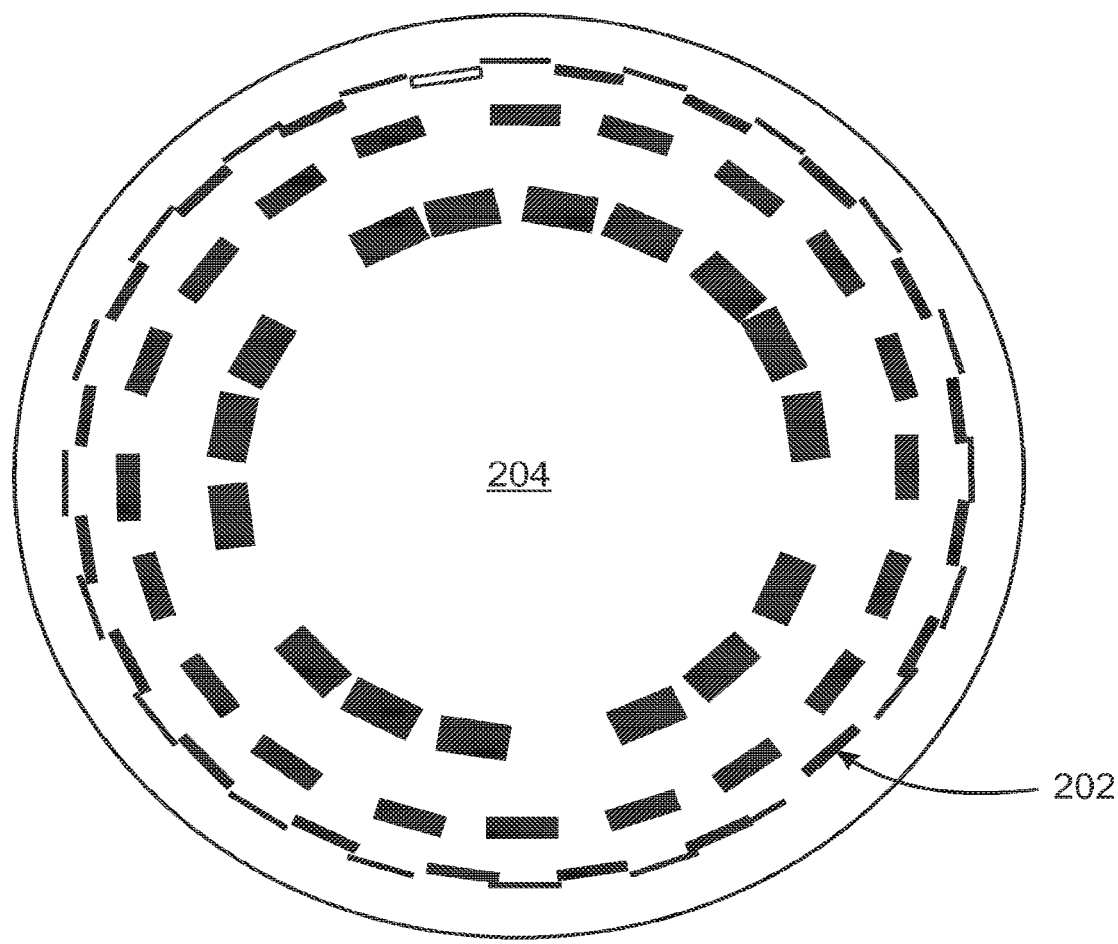
FIG. 2A is a top-down view of a volumetric capture dome.

FIG. 2A is a top-down view of a volumetric capture dome 200. The volumetric capture dome 200 is illustrated with a plurality of cameras 202 arranged about a scene 204. The cameras 202 are illustrated as black boxes along the edge of the volumetric capture dome 200. In the volumetric capture dome 200, the cameras 202 are arranged above and to the sides of the scene 204 to form a hemisphere shaped dome. While the cameras 202 are arranged in a hemisphere fashion, the present techniques may also use a full sphere camera arrangement, where cameras are arranged above, below, and to the sides of the scene in a full three-hundred-and-sixty-degree configuration. Moreover, the present techniques are not limited to the arrangement of cameras in a dome like structure. Instead, the cameras may be in any volumetric shape that surrounds a scene. Thus, the cameras may be configured along the edges of a square box, a rectangular box, an oval, pyramid, or any other shape. Moreover, the cameras may be placed throughout an existing structure, such as a sports stadium, arena, or venue. In each scenario, the cameras are placed such that the entire scene is captured from the outside in.

Volumetric video is captured from the outside-in, using the plurality of cameras along a perimeter of a three-dimensional scene to capture a three-dimensional data representation the scene. The volumetric video, including all associated data, may often be very large. A typical visual effects (VFX) pipeline can be used to process and render this large amount of data. However, volumetric data including a three-dimensional data representation may be too large to be rendered in real time or on mobile devices. Mobile devices often fail to include the processing capabilities of a VFX pipeline. Generally, the present techniques may be applied to any device that lacks a dedicated VFX pipeline, any device with limited processing capabilities, or any combination thereof.

In typical volumetric capture, depth and other values are often derived via 3D reconstruction. However, the large amount of data in traditional volumetric capture is not suitable for display on mobile devices. The present techniques enable an approximation of traditional volumetric rendering that can be rendered in real time, on devices with limited processing capabilities. In particular, the use of two-dimensional billboards limits the type of data used to render a volumetric video.

Figure 2B:
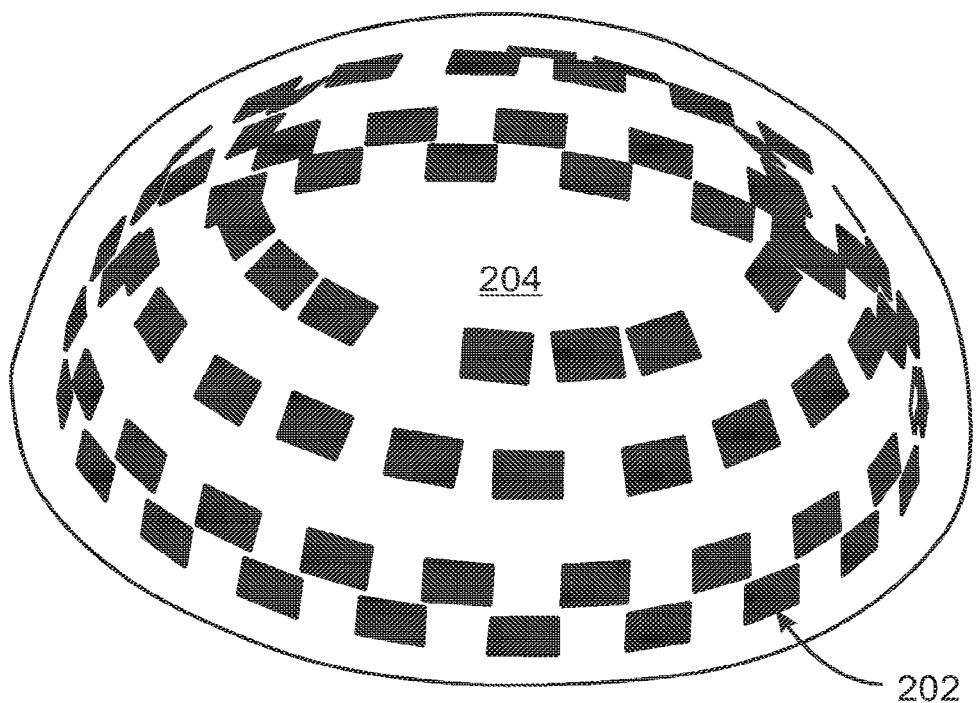
FIG. 2B is a side perspective view of the volumetric capture dome.

FIG. 2B is a side perspective view of the volumetric capture dome 200. Again, the volumetric capture dome 200 is illustrated with the plurality of cameras 202 arranged about the scene 204. Each camera of the plurality of cameras may be used to capture volumetric video. Volumetric video typically includes three-dimensional point clouds for each time instance as well as video data. In embodiments, the cameras may capture the scene with a horizontal resolution of approximately 5,000 pixels. Accordingly, the cameras may be referred to as 5 k cameras. The cameras may also be 4K cameras, with an approximate horizontal resolution of approximately 4,000 pixels. The number of cameras used in the volumetric capture dome may vary based on the resolution of the cameras, the arrangement of the cameras, the size of the volumetric capture dome, or any combination thereof. In examples, the volumetric capture dome 200 may include seventy-six 5K cameras. Additionally, in examples, the volumetric capture dome 200 may include one-hundred twenty 4K cameras. While particular numbers of cameras have been described, any number of cameras may be used. Further, as used herein each camera is associated with a unique camera view or camera perspective. Accordingly, each camera captures a slightly different view or perspective of the same content or scene.

In the example of a volumetric capture dome, each camera may be positioned where each resulting camera view is separated by about ten degrees from each neighboring camera view. In embodiments, a user can spin the scene around by swiping with a finger or other input device. Alternatively, the images can be rendered automatically. The camera perspectives are traversed, a viewer may observe a small jump as the neighboring camera views in this example do not overlap. Thus, as the viewer traverses through the images, the viewer may observe a snapping effect, where the scene jumps to each camera view as the scene is rotated. While interpolation can be applied to render "in between" images between neighboring camera views, the resulting blend of views may often result in an unnatural blur between images. The snap effect of the present techniques avoids additional computations to attempt depth-based interpolation between views, eliminates additional data used to store the additional interpolated images between views, and also enables a reduction in power consumption through lower processing requirements.

To enable rendering of the volumetric video on a mobile device, the particular views rendered in a scene captured via volumetric video are rendered according to a general real-world standard of movement from a user. For example, in rendering a volumetric video on a mobile device, a user can traverse through the scene in a predictable pattern. Put another way, from a first camera view, the next view to be rendered can be predicted as the next view is limited to a neighboring camera. A user may move the scene from a first position rendering a first camera image to the left, right, up, or down to a second position rendering a second camera image to observe the scene from various positions. This pattern of moving from one camera image to a next camera image is canonical in nature, where the next image to be rendered as a user moves through a scene is any one of a neighboring camera image. A neighboring image as used herein in an image that is borders or overlaps a current image. A neighboring camera as used herein in a camera that captures an image that is borders or overlaps an image captured by a current camera. For example, a neighboring image of the current image may be an image from the camera to the immediate left, right, above, or below the camera that captured the current image.

Each camera may model the captured scene via a weak perspective camera model. As used here, a camera model is used to map the three-dimensional captured scene to a two-dimensional image plane. In a volumetric capture dome, imaging objects are typically far from the camera. Due to this distance, perspective information is not included in the camera model. Moreover, small differences in 3D depth are practically unobservable at this distance and well approximated by scaled billboards. Scaling is applied to the projection from the camera model. The scale factor ensures that closer objects appear bigger in the rendered perspective image.

Each camera image to be rendered is decomposed into a number of moving regions. In embodiments, moving regions may be determined by eliminating the background and objects that are static across a plurality of images from a particular camera view. Machine learning may be used to identify the particular objects that are moving and are classified as moving regions. In some cases, a segmentation mask is used to extract the moving regions from each image. Each moving region may be tracked in a real-world space to produce a number of cropped videos of each moving region, for each camera view. Thus, in the case of a volumetric dome with seventy-six cameras, each camera tracks the identified moving regions.

FIG. 3 is an illustration of decomposing a plurality of frames 300 into moving regions. In FIG. 3, the frames 302, 304, 306, 308, 310, and 312 are illustrated from a first camera perspective. The plurality of frames 302, 304, 306, 308, 310, and 312 are illustrated with six moving regions numbered 1-6. Each moving region is surrounded by a bounding box. Each frame also includes a stationary goal. The goal is not a moving region, so the goal is illustrated without a bounding box. The goal serves as a datum so that the user can orient and position the video content without having to watch the whole clip. Accordingly, in embodiments, each static object in the volumetric content can serve as a data point that is used to orient and position the dynamic objects. In FIG. 3, each of moving region 1, moving region 2, moving region 3, and moving region 4 correspond to a player. Moving region 5 corresponds to the ball.

In embodiments, the plurality of frames 302, 304, 306, 308, 310, and 312 may be extracted from available existing volumetric video content represented as a series of point clouds and videos for each camera perspective. Camera positions, orientations, and intrinsic parameters are also known. Captured content may contain static objects that will not be encoded. As a preprocessing step, these static objects are identified and replaced with computer generated (CG) assets. These CG assets may be pre-rendered by an artist. Accordingly, in the example of the plurality of frames 302, 304, 306, 308, 310, and 312, the goal posts may be identified and replaced by pre-rendered gold posts. Further, the pre-rendered goal posts serve as a guiding data point for the placement of the moving regions 1-6. The goal posts may be rendered in a computer-generated background that is to replace a matte during rendering.

Dynamic objects, such as people and athletic equipment, can be detected in two-dimensions (2D) with machine learning and tracked in three-dimensions (3D) with a combination of 2D and 3D techniques. For example, machine learning may compare the location of a suspected moving region with the location of the same moving region in a next frame. A neural network may be trained via these locations and used to detect, segment, and predict the location of objects in subsequent frames. In embodiments, artist intervention may be used to disambiguate instances when dynamic objects are close to each other or when automatic techniques fail.

Figure 4:
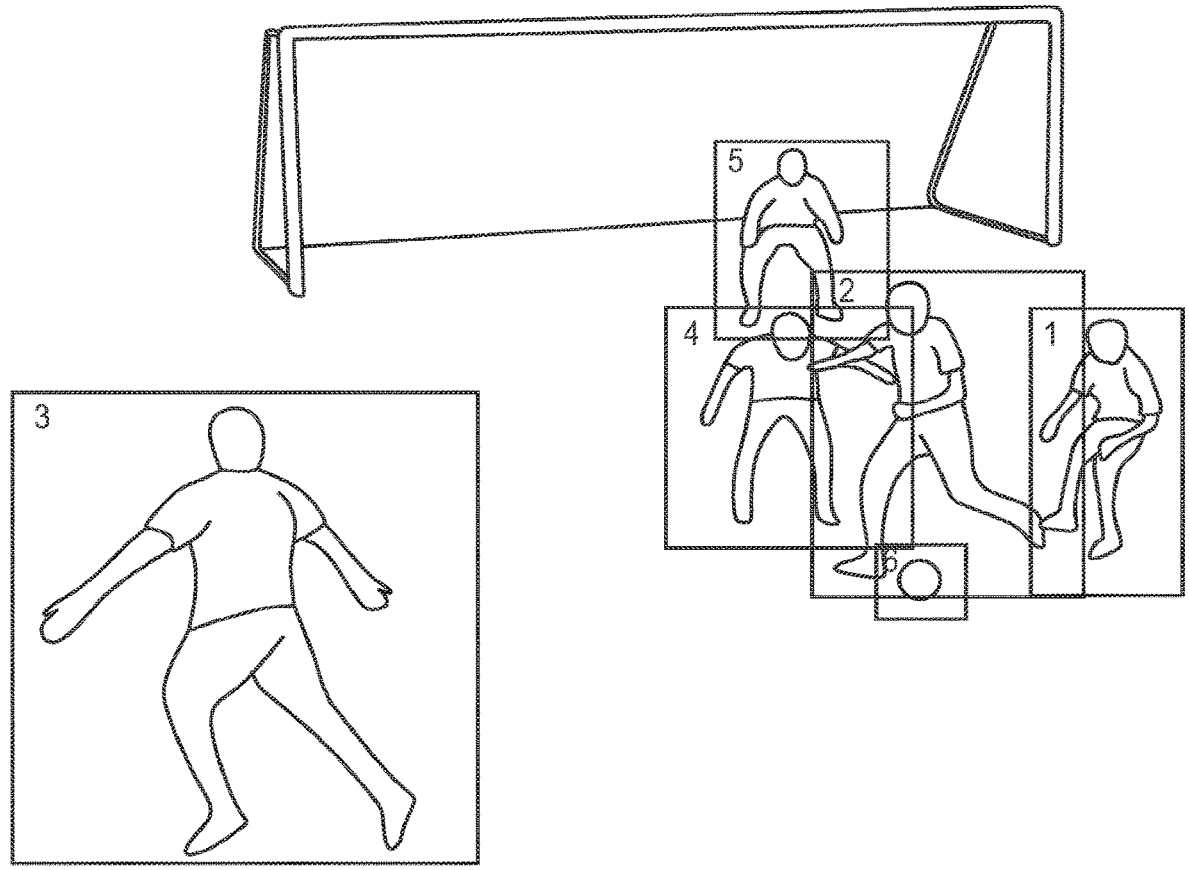
FIG. 4 is an illustration of a plurality of moving regions from a second camera perspective.

FIG. 4 is an illustration of a plurality of moving regions 400 from a second camera perspective. For each tracked object, a 2D bounding box is associated with the object that tightly frames the content within each box to define the moving region. The bounding box size and position vary as a function of time. Thus, for each camera perspective, the bounding box may change in size from one image frame to the next based on the size of the moving region. The size of the bounding box may be as close to the moving region as possible without clipping or intersecting with the moving region. The bounding boxes can also overlap between moving regions, so there may be some redundant content in the processed cropped videos. A scale factor is associated witch each bounding box that describes how to re-map each moving region into screen space from the cropped video. The cropped video is extracted into an encodable video for each moving region. The bounding boxes may be, for example, initially sized to completely include the moving tracked region. If a moving region is clipped by the bounding box, object of that moving region may be scaled down until it is small enough and can fit inside a particular size of video. For example, each video may be 512×512 pixels in size. If the object is smaller than the 512×512 video size, the object remains at the original pixel scale. Some cropped videos can be of a smaller size due to tracking a smaller object. The cropped videos may enable singular compression, and compression may be restricted to objects where changes in appearance or changes in the motion can be observed.

In some cases, each cropped video is pinned to a specific region in the aggregate video to exploit temporal coherence when video encoding. As discussed above, to be rendered in a lightweight format, each moving region may be represented by a billboard. The billboard is moving region along a plane that is parallel with the camera view. Accordingly, each billboard is camera facing and may be defined by a bounding box surrounding the moving region. In embodiments, the billboards can be encoded into one aggregate, combined video. Because each video/billboard representation refers to a particular view, temporal coherence occurs. That particular view is tightly cropped around the individual and so that because of some temporal coherence. If the originally captured 5 k images were rendered, the sheer size of the images prevents decoding at a speed high enough for video playback. Reducing the size of the video—cropping it down—enables a quicker playback speed. Thus, the cropped regions around the actor from particular views enables the temporal coherence and compression. The matte for each cropped video is encoded by setting the video background to a static color (e.g. pink or green), or using a video format that supports alpha channels.

FIG. 5 is a plurality of billboards 500 extracted from the second camera perspective. As discussed above, the billboards represent tightly cropped areas of moving regions in from each camera perspective. Thus, each moving region 1-6 is represented by a series of billboards extracted from an image in a sequence of images from the second camera perspective. The billboards 1-6 may be processed as a single video, where the billboards are encoded, transmitted, and decoded as a single unit. In embodiments, the location of cropped regions in the video layout is kept constant when possible to improve compression ratios with an MPEG or a High Efficiency Video Coding (HEVC) codec. Alternatively, each of the billboards 1-6 and corresponding cropped videos remain cropped so that they can be encoded and transmitted into separate video files, and also decoded independently among multiple processors of a mobile device. With each moving region representing separate video files, the moving regions can be decoded in parallel. The decoders may execute on separate processing units of the mobile device. The use of separate decoders enables a faster transition between views due to the increased processing power of additional processing units.

For each moving region, regardless of if the regions are to be encoded into a single video file or separate video files, additional processing may be done to the images. For example, alpha mattes are created using the point cloud to mask the video. With the alpha mattes, shadows are not captured by the cameras, and are instead inferred. Thus, alpha matting yields a silhouette of the moving region and creates a shadow on the ground based on the silhouette of the moving region. Occlusions are handled by alpha matting the cropped video to show the background when a CG asset appears in front of the point cloud.

During playback, viewers see billboards of each cropped video overlapped in screen space and in front of any CG assets. A video file can include the billboard data representations, where the billboards are rendered from the video file using 2D drawing techniques. Two-dimensional drawing techniques may use geometric models such as vector graphics, digital images including raster graphics. These techniques may also use 2D geometric transformations such as translation, rotation, and scaling. Since the virtual camera perspectives are fixed, CG assets can be packaged into each image of the video file as 2D renders. Alternatively, the background can be replaced with an image or video capture from the mobile device. The images can be rendered automatically, or the user can change viewing perspective by swiping left/right/up/down to see neighboring camera views in the dome configuration. Pinch/Zoom and long touch hold and drag actions are mapped to rescaling and translating the 2D composited image. This encoding and rendering technique enables viewers to experience volumetric content without the overhead of a more generic and sophisticated VFX rendering pipeline.

In embodiments, each billboard can be rendered using an augmented reality (AR) toolkit. Generally, augmented reality enables virtual content overlays to be applied to any background, including video scenery from the real world, photos, and the like. The virtual content may include visual and audio components. In embodiments, the moving regions as described above can be processed through an augmented reality (AR) toolkit to provide an illusion that the moving regions are placed in the real world. In this manner, an illusion is created that the contents happening are in front of the actual world. Toolkits may be developed that provide libraries and software utilities to realize the augmented reality functionality. The present techniques enable the creation of billboards that can be used as overlays in conjunction with an Android AR Toolkit, or an iOS Toolkit. While particular toolkits are described, the present techniques can be used with any AR toolkit. Moreover, the present techniques can be used with any AR packages.

When the billboards are used as AR content, the billboards can be rendered on top of a video being captured in real time. The matte portion of the billboard may be replaced by the video being captured. During this capture, the billboard overlaid content will appear to stay in a same location in the real world due to motion compensation by AR tracking. The user may lock the billboards into position, the billboards stay positioned in the real-world regardless of movement of the mobile device. In this manner, the billboards do not respond to jiggle or movement of the mobile device. Thus, the billboards enable the action created by the billboards to appear as though they are actually happening inside that video. The billboard overlaid content may also be scaled or rotated within the video.

With an AR toolkit, the true physical distance of the mobile device to a particular point captured by a video is known. Accordingly, when rendering a billboard via the AR toolkit, scaling of the billboard may be based on the known distance where the billboards are placed. For example, when a person is rendered via a billboard, the person can be automatically scaled to the correct size based on the distance in the video. The scaling may be based on the weak perspective camera model. In embodiments, a single depth measurement is used to summarize the three-dimensional information about the moving region within the billboard.

Figure 6:
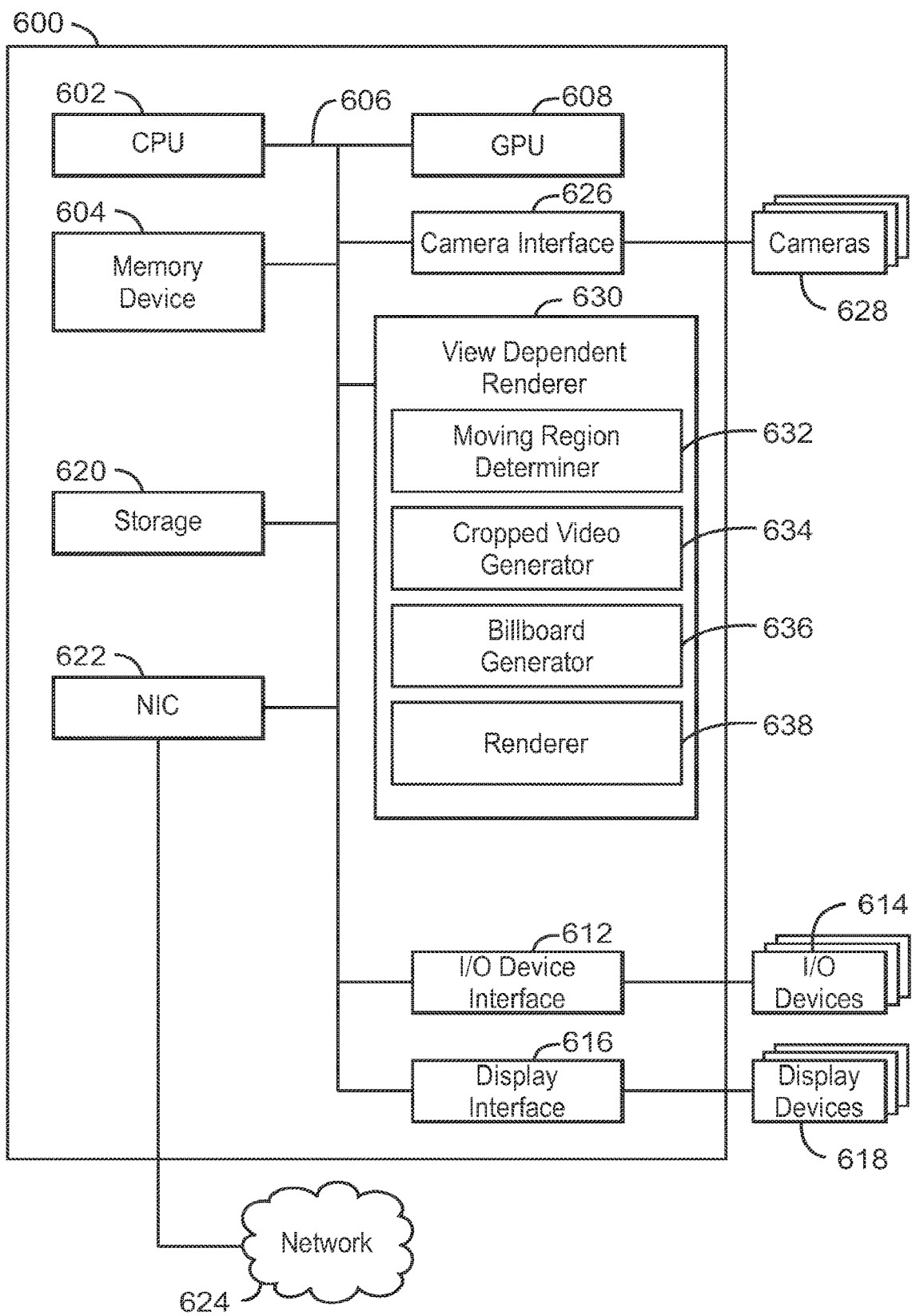
FIG. 6, a block diagram is shown illustrating an example computing device that can enable a lightweight view dependent rendering system.

Referring now to FIG. 6, a block diagram is shown illustrating an example computing device that can enable a lightweight view dependent rendering system. The mobile device 600 may be, for example, a laptop computer, tablet computer, mobile device, or wearable device, among others. In some examples, the mobile device 600 may be a cell phone. The mobile device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the mobile device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random-access memory (DRAM).

The mobile device 600 may also include a graphics processing unit (GPU) 608. As shown, the CPU 602 may be coupled through the bus 606 to the GPU 608. The GPU 608 may be configured to perform any number of graphics operations within the mobile device 600. For example, the GPU 608 may be configured to render or manipulate graphics images, graphics frames, videos, or the like, to be displayed to a user of the mobile device 600. In embodiments, the view dependent renderer may be executed by the CPU 602 or the GPU 608.

The CPU 602 may also be connected through the bus 606 to an input/output (I/O) device interface 612 configured to connect the mobile device 600 to one or more I/O devices 614. The I/O devices 614 may include, for example, a keyboard and a pointing device, wherein the pointing device may include a touchpad or a touchscreen, among others. The I/O devices 614 may be built-in components of the mobile device 600, or may be devices that are externally connected to the mobile device 600. In some examples, the memory device 604 may be communicatively coupled to I/O devices 614 through direct memory access (DMA).

The CPU 602 may also be linked through the bus 606 to a display interface 616 configured to connect the mobile device 600 to a display device 618. The display devices 618 may include a display screen that is a built-in component of the mobile device 600. The display devices 618 may also include a computer monitor, television, or projector, among others, that is internal to or externally connected to the mobile device 600. The display device 618 may also include a head mounted display.

The mobile device 600 also includes a storage device 620. The storage device 620 is a physical memory such as a hard drive, an optical drive, a thumb drive, an array of drives, a solid-state drive, or any combinations thereof. The storage device 620 may also include remote storage drives.

The mobile device 600 may also include a network interface controller (NIC) 622. The NIC 622 may be configured to connect the mobile device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The mobile device 600 further includes a camera interface 626. For example, the camera interface 626 may be connected to a plurality of cameras 628. In some examples, the plurality of cameras may be arranged in a volumetric camera dome. Additionally, in some cases, the cameras may be arranged in a plurality of rings. In some examples, the cameras 628 may be 5 k cameras. In some examples, cameras 628 may be used to capture multiple views of a scene.

The mobile device 600 further includes a lightweight view dependent renderer 630. For example, the lightweight view dependent renderer 630 can be used to generate camera views on a display of the mobile device 600. The lightweight view dependent renderer 630 can include a moving region determiner 632, a cropped video generator 634, a billboard generator 636, and a renderer 638. While the moving region determiner 632, cropped video generator 634, billboard generator 636, and renderer 638 are illustrated as separate modules, the function of each module may be combined into one or more modules.

In some examples, each of the components 632-638 of the lightweight view dependent renderer 630 may be a microcontroller, embedded processor, or software module. The moving region determiner 632 can determine a number of moving regions for each camera view. The moving regions may be determined from 3D point clouds. The cropped video generator 634 generates a video bitstream for each moving region from the sequence of images. A matte may be produced to segment the foreground region from the background. In this manner, the silhouette of each moving region is further defined, and not limited to the rectangular dimensions of a billboard bounding box. The billboard generator 636 generates a moving billboard representation for each moving region in each image of the video bitstream. The renderer 638 may be configured to render camera image and associated billboards in response to input by a user.

The block diagram of FIG. 6 is not intended to indicate that the mobile device 600 is to include all of the components shown in FIG. 6. Rather, the mobile device 600 can include fewer or additional components not illustrated in FIG. 6, such as additional buffers, additional processors, and the like. The mobile device 600 may include any number of additional components not shown in FIG. 6, depending on the details of the specific implementation. Furthermore, any of the functionalities of a moving region determiner 632, a cropped video generator 634, a billboard generator 636, and a renderer 638, may be partially, or entirely, implemented in hardware and/or in the processor 602. For example, the functionality may be implemented with an application specific integrated circuit, in logic implemented in the processor 602, or in any other device. For example, the functionality of the lightweight view dependent renderer 630 may be implemented with an application specific integrated circuit, in logic implemented in a processor, in logic implemented in a specialized graphics processing unit such as the GPU 608, or in any other device.

Figure 7:
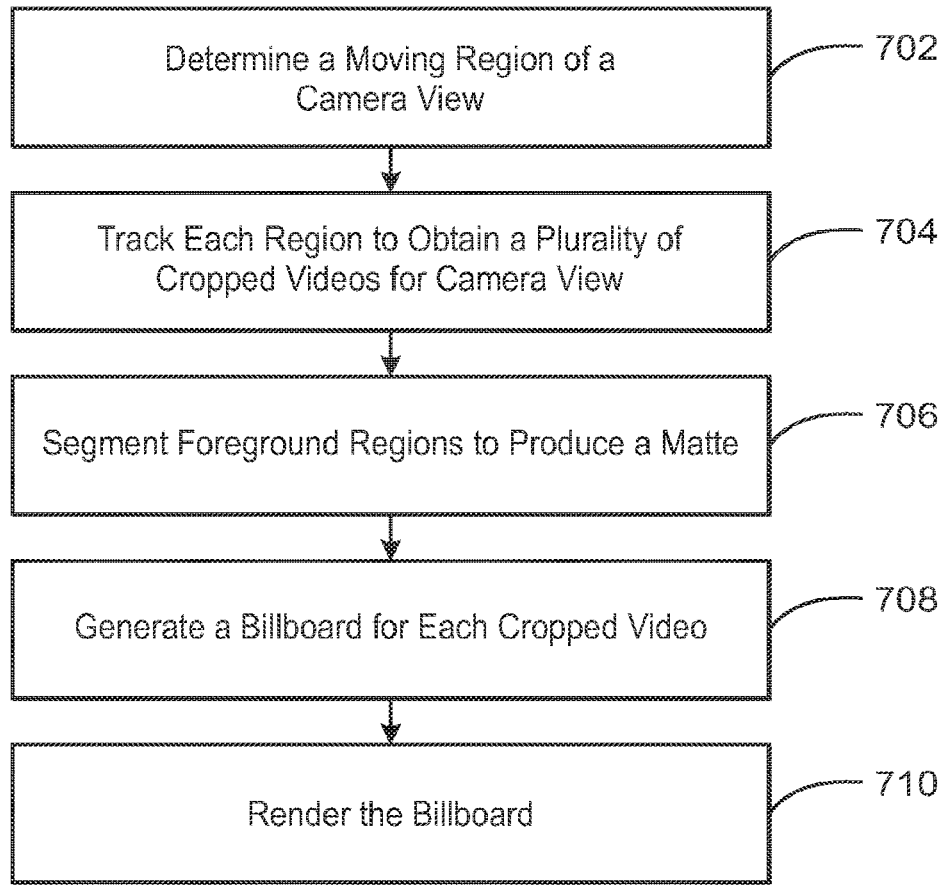
FIG. 7 is a process flow diagram illustrating a method for enabling lightweight view dependent rendering.

FIG. 7 is a process flow diagram illustrating a method 700 for enabling lightweight view dependent rendering. The example method is generally referred to by the reference number 700 and can be implemented using the computing device 104 of FIG. 1 above, the processor 602 of the mobile device of FIG. 6 above, or the computer readable media 800 of FIG. 8 below.

At block 702, a processor determines a moving region of a camera view. In embodiments, by configuring the cameras of the volumetric capture dome to capture content of the scene from perspectives that are canonical positions for rendering, the misalignment of overlapping billboards can be eliminated.

At block 704, the processor tracks the moving region to obtain a cropped video from the camera view. At block 706, a foreground region is segmented to produce a matte. At block 708, a billboard is generated for the cropped video. The data representation for the lightweight views described herein consist of two-dimensional cropped videos and some additional metadata about billboards.

At block 710, the billboard is rendered. The matte may be applied to the billboard, resulting in the silhouette of the moving region being rendered. In embodiments, the matte may be replaced by computer generated assets or a computer-generated background. Additionally, the matte may be replaced another image or video. In this manner, the billboard will appear to be rendered on top of the matte replacement.

While the user may traverse neighboring camera views or neighboring camera views are rendered automatically without user input, the present techniques restrict camera motions so that there is no parallax. Each camera view is rendered without having to embedded or infer depth information beyond the position of billboards. The present techniques also enable the volumetric video to be rendered in a lightweight manner, without embedded or inferred depth information beyond a position of portions of the video. In particular, motion or manipulation of the content that is captured by each camera is limited to a two-dimensional (2D) rescaling functionality and a translation functionality This process flow diagram is not intended to indicate that the blocks of the example process 700 are to be executed in any particular order, or that all of the blocks are to be included in every case. Further, any number of additional blocks not shown may be included within the example process 700, depending on the details of the specific implementation.

Figure 8:
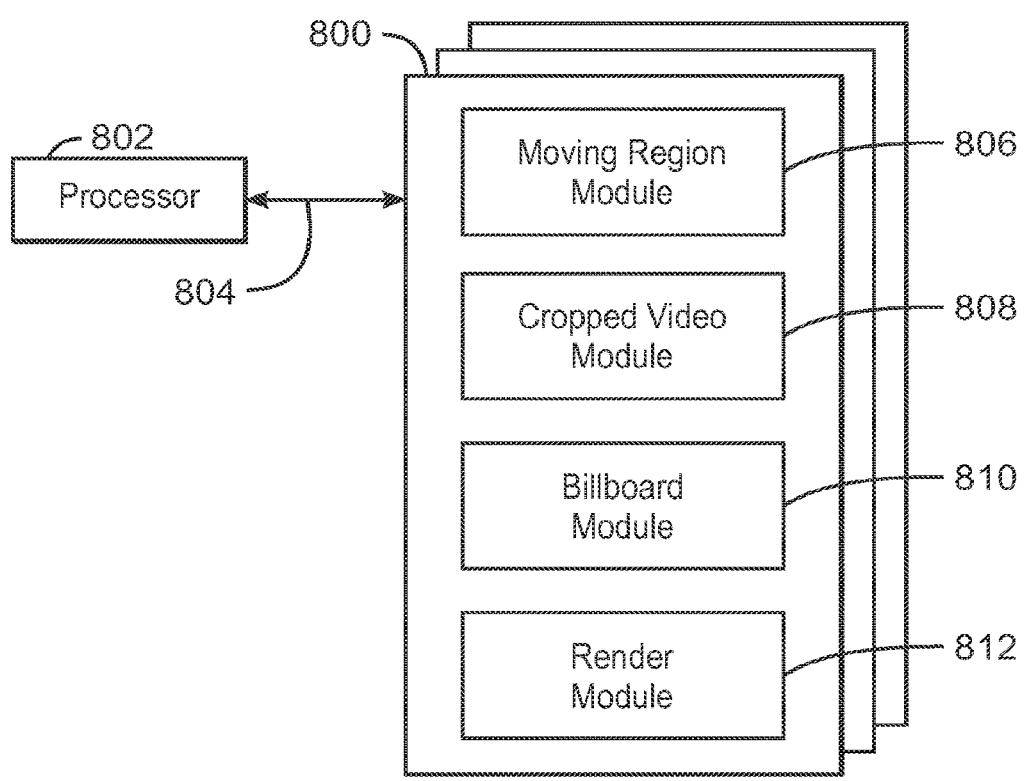
FIG. 8 is a block diagram showing computer readable media that enables lightweight view dependent rendering.

FIG. 8 is a block diagram showing computer readable media 800 that enables lightweight view dependent rendering. The computer readable media 800 may be accessed by a processor 802 over a computer bus 804. Furthermore, the computer readable media 800 may include code configured to direct the processor 802 to perform the methods described herein. In some embodiments, the computer readable media 800 may be non-transitory computer readable media. In some examples, the computer readable media 800 may be storage media.

The various software components discussed herein may be stored on one or more computer readable media 800, as indicated in FIG. 8. For example, a moving region module 806 may be configured to determine a moving region of a camera view. A cropped video module 808 may be configured to track each region to obtain a cropped video for each moving region in a camera view. A matte may be produced to segment the foreground region from the background. In this manner, the silhouette of each moving region is further defined, and not limited to the rectangular dimensions of a billboard bounding box. A billboard module 810 may be configured to generate a video for each cropped video. A render module 812 may be configured to render billboards. The billboards may be rendered via augmented reality.

The block diagram of FIG. 8 is not intended to indicate that the computer readable media 800 is to include all of the components shown in FIG. 8. Further, the computer readable media 800 may include any number of additional components not shown in FIG. 8, depending on the details of the specific implementation.

Example 1 is a system for lightweight view dependent rendering. The system includes a plurality of cameras configured to capture a volumetric scene; a memory; a processor configured to determine a moving region of a camera view, wherein the moving region is defined by a bounding box; track the moving region to obtain a cropped video from the camera view; segment a foreground region from the cropped video to produce a matte; generate a billboard for the cropped video; and render the billboard, wherein the matte is applied to the billboard.

Example 2 includes the system of example 1, including or excluding optional features. In this example, the billboard is rendered via an augmented reality toolkit.

Example 3 includes the system of any one of examples 1 to 2, including or excluding optional features. In this example, the billboard is rendered on top of computer-generated objects and a background by replacing the matte with the computer-generated objects and the background.

Example 4 includes the system of any one of examples 1 to 3, including or excluding optional features. In this example, the moving region is extracted from a three-dimensional data representation.

Example 5 includes the system of any one of examples 1 to 4, including or excluding optional features. In this example, the moving region is a person.

Example 6 includes the system of any one of examples 1 to 5, including or excluding optional features. In this example, the moving region is tracked in the camera view via machine learning.

Example 7 includes the system of any one of examples 1 to 6, including or excluding optional features. In this example, the billboard is encoded into a single video.

Example 8 includes the system of any one of examples 1 to 7, including or excluding optional features. In this example, the system includes a plurality of billboards from the camera view, wherein each billboard of the plurality of billboards is encoded and transmitted independently.

Example 9 includes the system of any one of examples 1 to 8, including or excluding optional features. In this example, the system includes a plurality of billboards from the camera view, wherein the plurality of billboards is encoded and transmitted via a single video file.

Example 10 includes the system of any one of examples 1 to 9, including or excluding optional features. In this example, the billboard is scaled to render the billboard into an augmented reality.

Example 11 is a method for lightweight view dependent rendering. The method includes determining a moving region of a camera view, wherein the moving region is defined by a bounding box; tracking the moving region to obtain a cropped video from the camera view; segmenting a foreground region from the cropped video to produce a matte; generating a billboard for the cropped video; and rendering the billboard, wherein the matte is applied to the billboard.

Example 12 includes the method of example 11, including or excluding optional features. In this example, the billboard is rendered via an augmented reality toolkit.

Example 13 includes the method of any one of examples 11 to 12, including or excluding optional features. In this example, the billboard is rendered on top of computer-generated objects and a background by replacing the matte with the computer-generated objects and the background.

Example 14 includes the method of any one of examples 11 to 13, including or excluding optional features. In this example, the moving region is extracted from a three-dimensional data representation.

Example 15 includes the method of any one of examples 11 to 14, including or excluding optional features. In this example, the moving region is sporting equipment manipulated during an athletic event.

Example 16 includes the method of any one of examples 11 to 15, including or excluding optional features. In this example, the moving region is tracked the camera view via machine learning.

Example 17 includes the method of any one of examples 11 to 16, including or excluding optional features. In this example, the billboard for each camera view is encoded into a single video.

Example 18 includes the method of any one of examples 11 to 17, including or excluding optional features. In this example, the method includes a plurality of billboards from the camera view, wherein each billboard of the plurality of billboards is encoded and transmitted independently.

Example 19 includes the method of any one of examples 11 to 18, including or excluding optional features. In this example, the method includes a plurality of billboards from the camera view, wherein the plurality of billboards is encoded and transmitted via a single video file.

Example 20 includes the method of any one of examples 11 to 19, including or excluding optional features. In this example, the billboard is scaled to render the billboard into an augmented reality.

Example 21 is an apparatus. The apparatus includes a plurality of cameras configured to capture a volumetric scene; a processor to generate a 3D data representation of the volumetric scene; the processor configured to determine a moving region from the 3D data representation, wherein the moving region is defined by a bounding box; track the moving region to obtain a cropped video from the 3D data representation; segment a foreground region from the cropped video to produce a matte; generate a billboard for the cropped video; and render the billboard, wherein the matte is applied to the billboard.

Example 22 includes the apparatus of example 21, including or excluding optional features. In this example, the billboard is rendered via an augmented reality toolkit.

Example 23 includes the apparatus of any one of examples 21 to 22, including or excluding optional features. In this example, the billboard is rendered on top of computer-generated objects and a background by replacing the matte with the computer-generated objects and the background.

Example 24 includes the apparatus of any one of examples 21 to 23, including or excluding optional features. In this example, the 3D data representation is a point cloud.

Example 25 includes the apparatus of any one of examples 21 to 24, including or excluding optional features. In this example, the moving region is a person.

Example 26 includes the apparatus of any one of examples 21 to 25, including or excluding optional features. In this example, the moving region is tracked in the 3D data representation via machine learning.

Example 27 includes the apparatus of any one of examples 21 to 26, including or excluding optional features. In this example, the billboard is encoded into a single video.

Example 28 includes the apparatus of any one of examples 21 to 27, including or excluding optional features. In this example, the apparatus includes a plurality of billboards from the 3D data representation, wherein each billboard of the plurality of billboards is encoded and transmitted independently.

Example 29 includes the apparatus of any one of examples 21 to 28, including or excluding optional features. In this example, the apparatus includes a plurality of billboards from the 3D data representation, wherein the plurality of billboards is encoded and transmitted via a single video file.

Example 30 includes the apparatus of any one of examples 21 to 29, including or excluding optional features. In this example, the billboard is scaled to render the billboard into an augmented reality.

Example 31 is at least one non-transitory machine-readable medium having instructions stored therein that. The computer-readable medium includes instructions that direct the processor to determine a moving region of a camera view, wherein the moving region is defined by a bounding box; track the moving region to obtain a cropped video from the camera view; segment a foreground region from the cropped video to produce a matte; generate a billboard for the cropped video; and render the billboard, wherein the matte is applied to the billboard.

Example 32 includes the computer-readable medium of example 31, including or excluding optional features. In this example, the billboard is rendered via an augmented reality toolkit.

Example 33 includes the computer-readable medium of any one of examples 31 to 32, including or excluding optional features. In this example, the billboard is rendered on top of computer-generated objects and a background by replacing the matte with the computer-generated objects and the background.

Example 34 includes the computer-readable medium of any one of examples 31 to 33, including or excluding optional features. In this example, the moving region is extracted from a three-dimensional data representation.

Example 35 includes the computer-readable medium of any one of examples 31 to 34, including or excluding optional features. In this example, the moving region is sporting equipment manipulated during an athletic event.

Example 36 includes the computer-readable medium of any one of examples 31 to 35, including or excluding optional features. In this example, the moving region is tracked the camera view via machine learning.

Example 37 includes the computer-readable medium of any one of examples 31 to 36, including or excluding optional features. In this example, the billboard for each camera view is encoded into a single video.

Example 38 includes the computer-readable medium of any one of examples 31 to 37, including or excluding optional features. In this example, the computer-readable medium includes a plurality of billboards from the camera view, wherein each billboard of the plurality of billboards is encoded and transmitted independently.

Example 39 includes the computer-readable medium of any one of examples 31 to 38, including or excluding optional features. In this example, the computer-readable medium includes a plurality of billboards from the camera view, wherein the plurality of billboards is encoded and transmitted via a single video file.

Example 40 includes the computer-readable medium of any one of examples 31 to 39, including or excluding optional features. In this example, the billboard is scaled to render the billboard into an augmented reality.

Example 41 is an apparatus. The apparatus includes instructions that direct the processor to a plurality of cameras configured to capture a volumetric scene; a processor to generate a 3D data representation of the volumetric scene; the means for lightweight rendering configured to determine a moving region from the 3D data representation, wherein the moving region is defined by a bounding box; track the moving region to obtain a cropped video from the 3D data representation; segment a foreground region from the cropped video to produce a matte; generate a billboard for the cropped video; and render the billboard, wherein the matte is applied to the billboard.

Example 42 includes the apparatus of example 41, including or excluding optional features. In this example, the billboard is rendered via an augmented reality toolkit.

Example 43 includes the apparatus of any one of examples 41 to 42, including or excluding optional features. In this example, the billboard is rendered on top of computer-generated objects and a background by replacing the matte with the computer-generated objects and the background.

Example 44 includes the apparatus of any one of examples 41 to 43, including or excluding optional features. In this example, the 3D data representation is a point cloud.

Example 45 includes the apparatus of any one of examples 41 to 44, including or excluding optional features. In this example, the moving region is a person.

Example 46 includes the apparatus of any one of examples 41 to 45, including or excluding optional features. In this example, the moving region is tracked in the 3D data representation via machine learning.

Example 47 includes the apparatus of any one of examples 41 to 46, including or excluding optional features. In this example, the billboard is encoded into a single video.

Example 48 includes the apparatus of any one of examples 41 to 47, including or excluding optional features. In this example, the apparatus includes a plurality of billboards from the 3D data representation, wherein each billboard of the plurality of billboards is encoded and transmitted independently.

Example 49 includes the apparatus of any one of examples 41 to 48, including or excluding optional features. In this example, the apparatus includes a plurality of billboards from the 3D data representation, wherein the plurality of billboards is encoded and transmitted via a single video file.

Example 50 includes the apparatus of any one of examples 41 to 49, including or excluding optional features. In this example, the billboard is scaled to render the billboard into an augmented reality.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A mobile device comprising:
   a display;
   instructions; and
   processor circuitry to execute the instructions to:
   extract an identified moving region within a first frame of a first set of frames of volumetric video content, the volumetric video content captured by a plurality of real-world cameras facing a scene at different angles, the first set of frames captured by a first camera of the plurality of cameras, a location of the identified moving region determined based on an analysis of the first set of frames;
   extract a suspected moving region within a second one of the first set of frames, a location of the suspected moving region determined based on portions of the volumetric video content captured by ones of the plurality of cameras other than the first camera, the identified moving region and the suspected moving region associated with a same real-world object in the scene;
   generate a first billboard based on a cropped area of ones of the frames in the first set of frames, the cropped area corresponding to at least one of the identified moving region or the suspected moving region;
   in response to user selection of a first view of the scene associated with a first perspective of the first camera, cause presentation of the first billboard on the display; and
   in response to a change from the first view to a second view of the scene associated with a second perspective of a second camera of the plurality of cameras, cause a second billboard to replace the first billboard on the display, the second billboard based on a second set of frames of the volumetric video content captured by the second camera.

2. The mobile device of claim 1, wherein the processor circuitry is to:
   in response to the user selection of the first view, cause presentation of a first background image, the first background image corresponding to the first perspective of the first camera, the first billboard to be presented in front of the first background image; and
   in response to the change from the first view to the second view, cause a second background image to replace the first background image, the second background image corresponding to the second perspective of the second camera, the second billboard to be presented in front of the second background image.

3. The mobile device of claim 1, wherein the plurality of cameras are external to the mobile device, the mobile device further including an internal camera to capture a feed of a real-world environment, the processor circuitry to cause the presentation of the first billboard to overlay the feed of the real-world environment.

4. The mobile device of claim 3, wherein the processor circuitry is to compensate for motion of the mobile device so that the first billboard appears at a fixed location within the real-world environment.

5. The mobile device of claim 3, wherein the processor circuitry is to scale the first billboard based on a distance between the mobile device and a point in the real-world environment captured by the internal camera.

6. The mobile device of claim 1, wherein the first set of frames includes static content adjacent the identified moving region, the processor circuitry to replace the static content with computer generated content.

7. The mobile device of claim 1, wherein the mobile device is a head mounted display.

8. The mobile device of claim 1, wherein the processor circuitry is to determine the change from the first view to the second view based on a detected change in position of the mobile device.

9. At least one computer readable storage device comprising instructions that, when executed, cause at least one processor to:
   extract an identified moving region within a first frame of a first set of frames of volumetric video content, the volumetric video content captured by a plurality of real-world cameras facing a scene at different angles, the first set of frames captured by a first camera of the plurality of cameras, a location of the identified moving region determined based on an analysis of the first set of frames;
   extract a suspected moving region within a second one of the first set of frames, a location of the suspected moving region determined based on portions of the volumetric video content captured by ones of the plurality of cameras other than the first camera, the identified moving region and the suspected moving region associated with a same real-word object in the scene;

generate a first billboard based on a cropped area of ones of the frames in the first set of frames, the cropped area corresponding to at least one of the first identified moving region or the suspected moving region;

in response to user selection of a first view of the scene associated with a first perspective of the first camera, cause presentation of the first billboard on a display; and in response to a change from the first view to a second view of the scene associated with a second perspective of a second camera of the plurality of cameras, cause a second billboard to replace the first billboard on the display, the second billboard based on a second set of frames of the volumetric video content captured by the second camera.

10. The at least one computer readable storage device of claim 9, wherein the instructions cause the at least one processor to:

in response to the user selection of the first view, cause presentation of a first background image, the first background image corresponding to the first perspective of the first camera, the first billboard to be presented in front of the first background image; and in response to the change from the first view to the second view, cause a second background image to replace the first background image, the second background image corresponding to the second perspective of the second camera, the second billboard to be presented in front of the second background image.

11. The at least one computer readable storage device of claim 9, wherein the instructions cause the at least one processor to cause the presentation of the first billboard to overlay a camera feed of a real-world environment, the camera feed provided by an internal camera in a mobile device containing the at least one processor, the internal camera distinct from the plurality of real-world cameras.

12. The at least one computer readable storage device of claim 11, wherein the instructions cause the at least one processor to compensate for motion of the mobile device so that the first billboard appears at a fixed location within the real-world environment.

13. The at least one computer readable storage device of claim 11, wherein the instructions cause the at least one processor to scale the first billboard based on a distance between the mobile device and a point in the real-world environment captured by the internal camera.

14. The at least one computer readable storage device of claim 9, wherein the first set of frames includes a static content adjacent the identified moving region, the instructions to cause the at least one processor to replace the static content with computer generated content.

15. The at least one computer readable storage device of claim 9, wherein the instructions cause the at least one processor to determine the change from the first view to the second view based on a detected change in position of a mobile device containing the at least one processor.

16. An apparatus comprising:

means for displaying visual content;

means for extracting, the extracting means to:

extract an identified moving region within a first frame of a first set of frames of volumetric video content, the volumetric video content captured by a plurality of real-world cameras facing a scene at different angles, the first set of frames captured by a first camera of the plurality of cameras, a location of the identified moving region determined based on an analysis of the first set of frames; and extract a suspected moving region within a second one of the first set of frames, a location of the suspected moving region determined based on portions of the volumetric video content captured by ones of the plurality of cameras other than the first camera, the identified moving region and the suspected moving region associated with a same real-world object in the scene;

means for generating billboards, the generating means to generate a first billboard based on a cropped area of ones of the frames in the first set of frames, the cropped area corresponding to at least one of the identified moving region or the suspected moving region; and means for rendering, the rendering means to:

in response to user selection of a first view of the scene associated with a first perspective of the first camera, render the first billboard for presentation on the displaying means; and in response to a change from the first view to a second view of the scene, render a second billboard to replace the first billboard on the displaying means, the second billboard based on a second set of frames.

17. The apparatus of claim 16, further including means for capturing a video feed of a real-world environment, the rendering means to render the first billboard to overlay the video feed, the capturing means distinct from the plurality of real-world cameras.

18. The apparatus of claim 17, wherein the rendering means is to scale the first billboard based on a distance between the capturing means and a point in the real-world environment captured by the capturing means.

19. The apparatus of claim 17, wherein the rendering means is to compensate for motion of the apparatus so that the first billboard appears at a fixed location within the real-world environment.

20. The apparatus of claim 16, wherein the rendering means is to determine the change from the first view to the second view based on a detected change in position of the apparatus.

* * * * *